United States Patent
Kanehagi et al.

(10) Patent No.: US 9,910,778 B2
(45) Date of Patent: Mar. 6, 2018

(54) OPERATION PROCESSING APPARATUS AND CONTROL METHOD OF OPERATION PROCESSING APPARATUS

(71) Applicant: FUJITSU LIMITED, Kawasaki-shi, Kanagawa (JP)

(72) Inventors: Yohei Kanehagi, Kawasaki (JP); Hiroyuki Kojima, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 8 days.

(21) Appl. No.: 15/156,890

(22) Filed: May 17, 2016

(65) Prior Publication Data

US 2017/0024321 A1    Jan. 26, 2017

(30) Foreign Application Priority Data

Jul. 23, 2015   (JP) .................................. 2015-145934

(51) Int. Cl.
G06F 12/08      (2016.01)
G06F 12/0831    (2016.01)
G06F 12/0811    (2016.01)
G06F 12/084     (2016.01)
G06F 12/0817    (2016.01)

(52) U.S. Cl.
CPC ........ *G06F 12/0833* (2013.01); *G06F 12/084* (2013.01); *G06F 12/0811* (2013.01); *G06F 12/0822* (2013.01); *G06F 2212/1016* (2013.01); *G06F 2212/2542* (2013.01)

(58) Field of Classification Search
CPC ............ G06F 12/0811; G06F 12/0822; G06F 12/0833; G06F 12/084; G06F 2212/1016; G06F 2212/2542
See application file for complete search history.

(56) References Cited

U.S. PATENT DOCUMENTS 5,361,342 A * 11/1994 Tone ................... G06F 12/0822
                                                      711/121
2008/0313411 A1   12/2008 Sugizaki
2009/0106494 A1 *  4/2009 Knebel ................. G06F 12/128
                                                      711/119

(Continued)

FOREIGN PATENT DOCUMENTS

WO      2007/099583      9/2007

*Primary Examiner* — Aracelis Ruiz
(74) *Attorney, Agent, or Firm* — Fujitsu Patent Center

(57) ABSTRACT

An operation processing apparatus includes: processor cores configured to perform an operation processing; cache memories each provided for the respective processor cores; and a controller configured to perform a coherency control between the cache memories, wherein, the controller, in the coherency control, in a case where one or more shared cache memories which share a target data block for a store request are present in the cache memories when the store request is received from a request cache memory included in the cache memories: controls one cache memory of the one or more shared cache memories such that the target data block is transferred to the request cache memory; receives an exclusive right acquisition response from another operation processing apparatus which manages a state of the target data block; and transmits the exclusive right acquisition response to the request cache memory.

10 Claims, 12 Drawing Sheets

(56) References Cited

U.S. PATENT DOCUMENTS

2010/0088472 A1* 4/2010 Ukai .................. G06F 12/0815
  711/130
2012/0005439 A1* 1/2012 Ukai .................. G06F 12/0822
  711/158
2015/0220440 A1* 8/2015 Aga .................. G06F 12/0835
  711/141

* cited by examiner

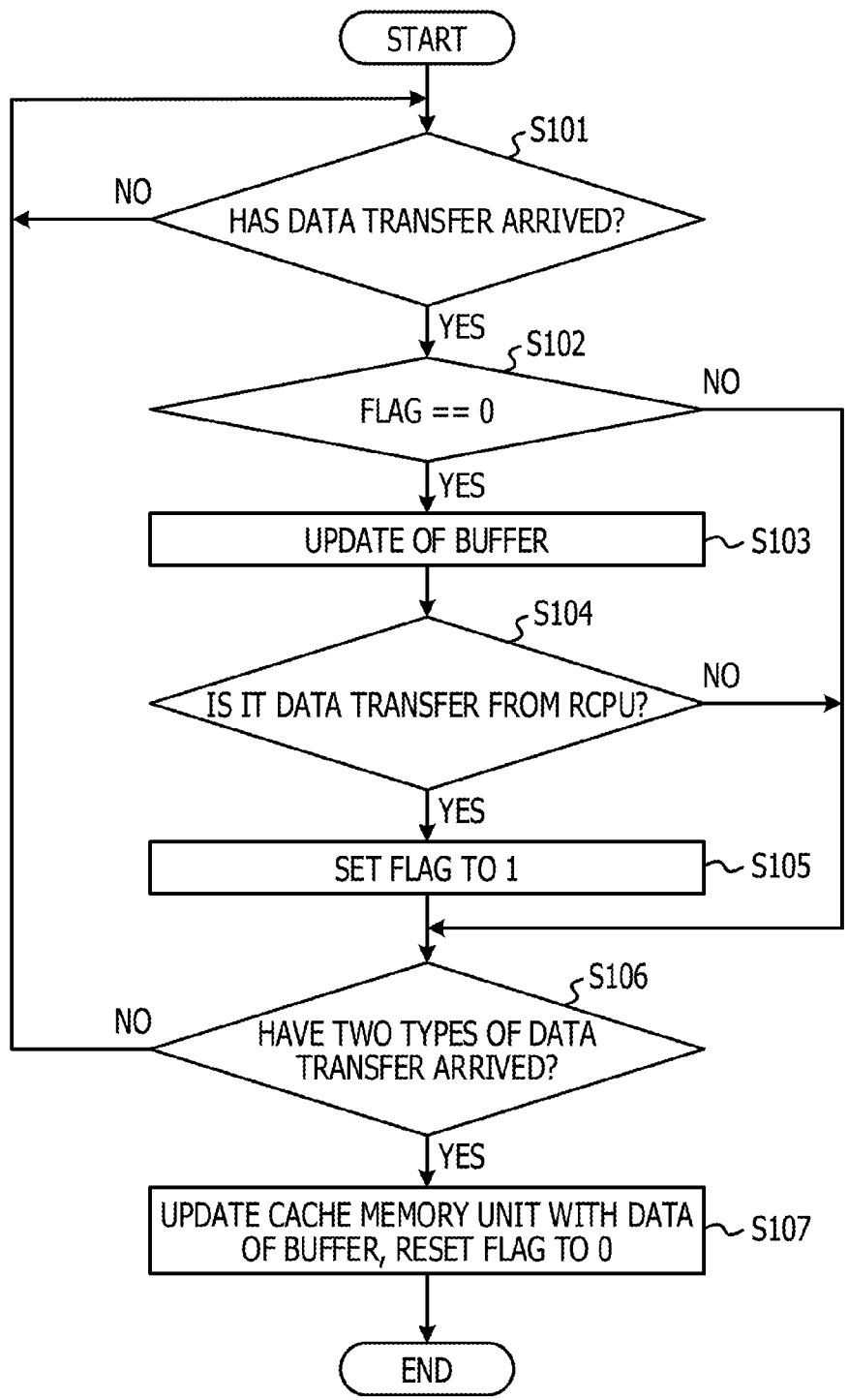

US 9,910,778 B2

OPERATION PROCESSING APPARATUS AND CONTROL METHOD OF OPERATION PROCESSING APPARATUS

CROSS-REFERENCE TO RELATED APPLICATION

This application is based upon and claims the benefit of priority of the prior Japanese Patent Application No. 2015-145934, filed on Jul. 23, 2015, the entire contents of which are incorporated herein by references.

FIELD

The embodiments discussed herein are related to an operation processing apparatus and a control method of the operation processing apparatus.

BACKGROUND

There is a multiprocessor system called a directory-based cache coherent Non Uniform Memory Access (ccNUMA) including a plurality of pairs of a Central Processing Unit (CPU) and a memory where respective memories are shared by a plurality of CPUs. In the directory-based ccNUMA multiprocessor system, each CPU using a directory maintains a coherency between the data stored in a memory connected to the CPU and the data held in a cache memory by each CPU. The directory includes information, for example, on the locations of data in the distributed memories, and is managed and controlled by each CPU.

In the International Publication Pamphlet No. 2007/099583, a technique is disclosed in which a system controller has a copy of tags of a cache device and a next state transition of a data block is finally judged with a response packet upon completion of a snoop process.

A related technique is disclosed in, for example, International Publication Pamphlet No. WO 2007/099583.

SUMMARY

According to one aspect of the embodiments, an operation processing apparatus comprising: a plurality of processor cores configured to perform an operation processing; a plurality of cache memories each provided for the respective processor cores; and a controller configured to perform a coherency control between the plurality of cache memories, wherein, the controller, in the coherency control, in a case where one or more shared cache memories which share a target data block for a store request are present in the plurality of cache memories when the store request is received from a request cache memory included in the plurality of cache memories: controls one cache memory of the one or more shared cache memories such that the target data block is transferred to the request cache memory; receives an exclusive right acquisition response from another operation processing apparatus which manages a state of the target data block; and transmits the exclusive right acquisition response to the request cache memory.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is a flowchart illustrating an example of a process for data update of the L2 cache memory of the operation processing apparatus in the present embodiment;

DESCRIPTION OF EMBODIMENTS

Figure 10:
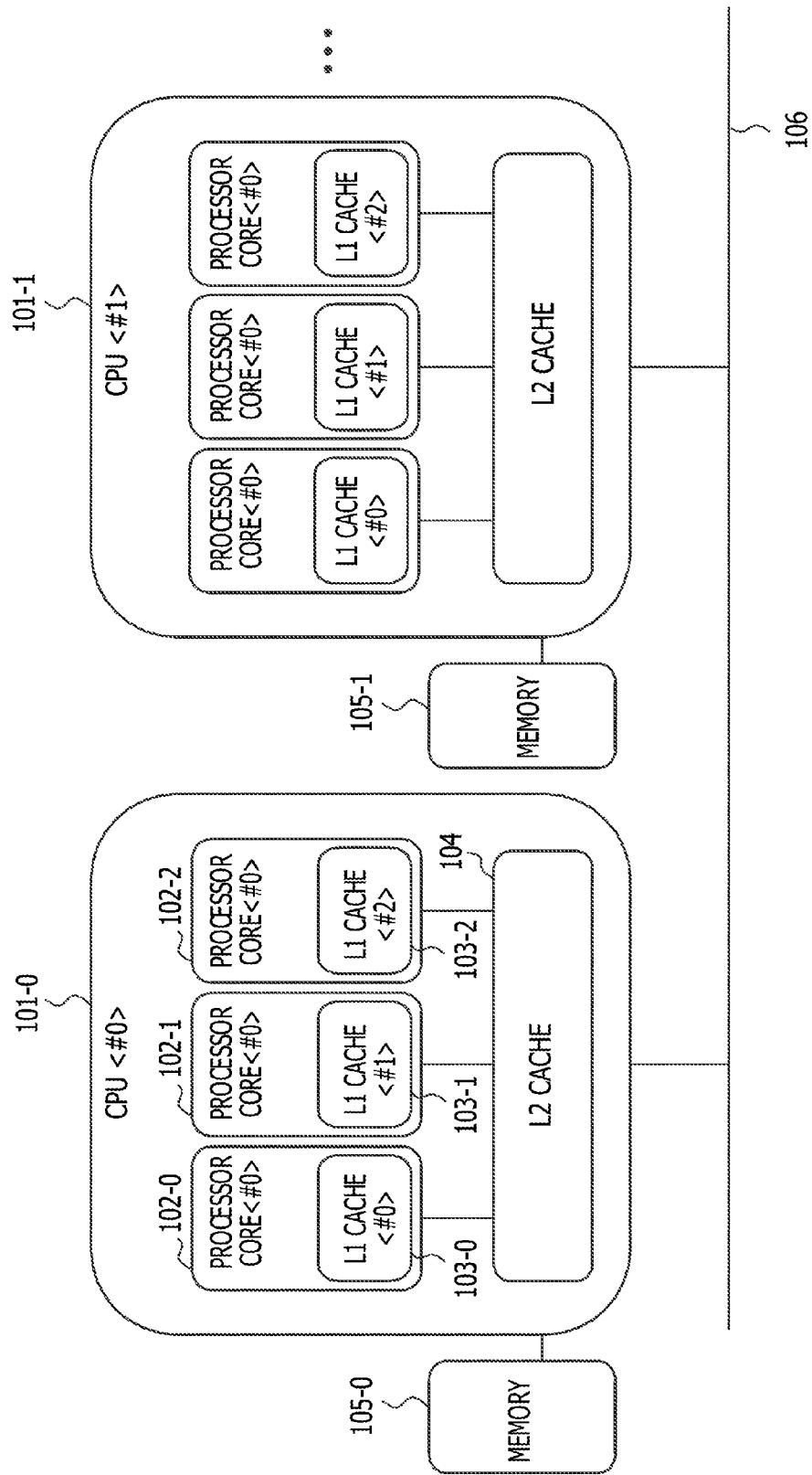
FIG. 10 is a block diagram illustrating an exemplary configuration of a directory-based ccNUMA multiprocessor system.

In the directory-based ccNUMA multiprocessor system, a CPU which has issued a certain request is called a Local CPU (LCPU), a CPU which has a directory of an address accessed by the request is called a Home CPU (HCPU), and other CPUs are called Remote CPUs (RCPUs). An exemplary configuration of a directory-based ccNUMA multiprocessor system is illustrated in FIG. 10. The multiprocessor system illustrated in FIG. 10 includes a plurality of pairs of a CPU 101 (101-0, 101-1, ... ) and a memory 105 (105-0, 105-1, ... ). A plurality of CPUs of CPU <#0> 101-0, CPU <#1> 101-1, ... are connected with each other through a bus 106.

Each CPU 101 is a CPU having a two-tier shared cache configuration in which a plurality of processor cores 102, each of which including a primary (L1: Level-1) cache memory 103, share a secondary (L2: Level-2) cache memory 104. FIG. 10 illustrates an example in which each CPU 101 includes three processor cores 102-0, 102-1, and 102-2. The processor core 102 performs an operation processing using data held in L1 cache memory 103 or issues a request such as a store request. The L2 cache memory 104 maintains a data block stored in a memory 105. The L2 cache memory 104 performs an arbitration between the processor cores 102 and an arbitration between the CPUs 101. Here, each processor core may correspond to an operation processing unit.

The state of the data block is managed by using, for example, a Modified Exclusive Shared Invalid (MESI) protocol. The M (Modify) state indicates a state where a processor core maintains a data block and a data value is in a non-clean (i.e., dirty) state in the MESI protocol. The E (Exclusive) state indicates a state where a processor core maintains a data block and a data value is in a clean state. The S (Multicore shared) state indicates that a plurality of processor cores share a data block in a clean state. The I (Invalid) state indicates a state where a data block is invalid.

Figure 11:
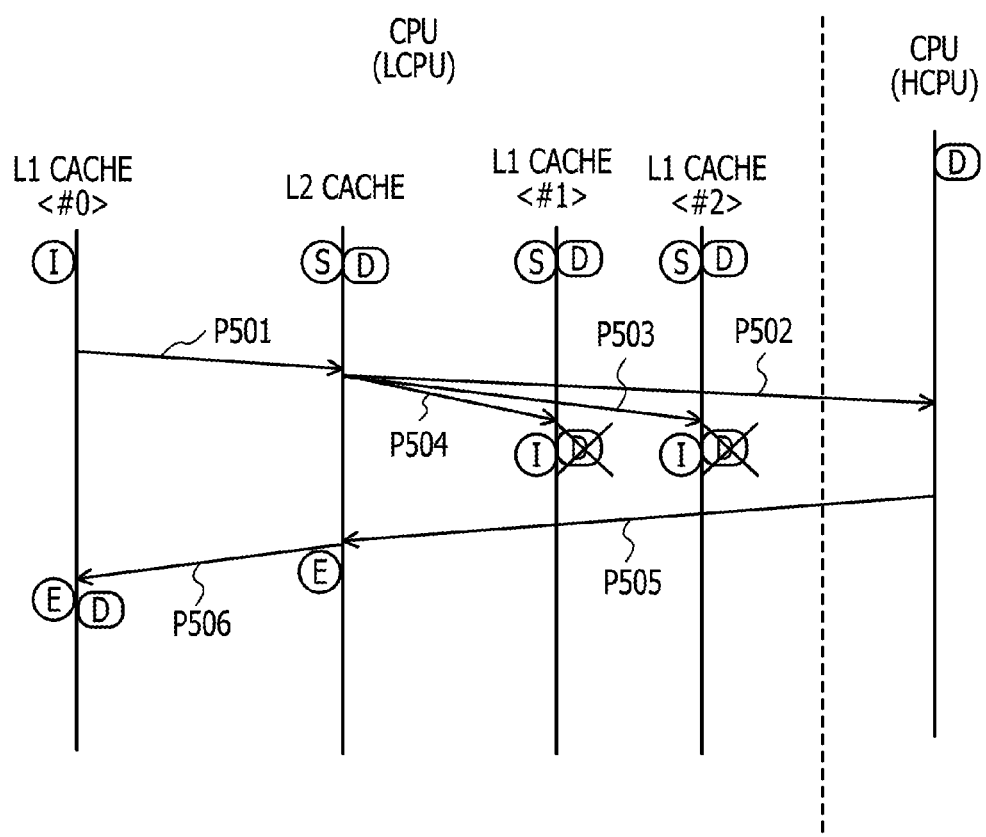
FIG. 11 is a sequence chart illustrating an example of the block type change processing in the multiprocessor system illustrated in FIG. 10.
Figure 12:
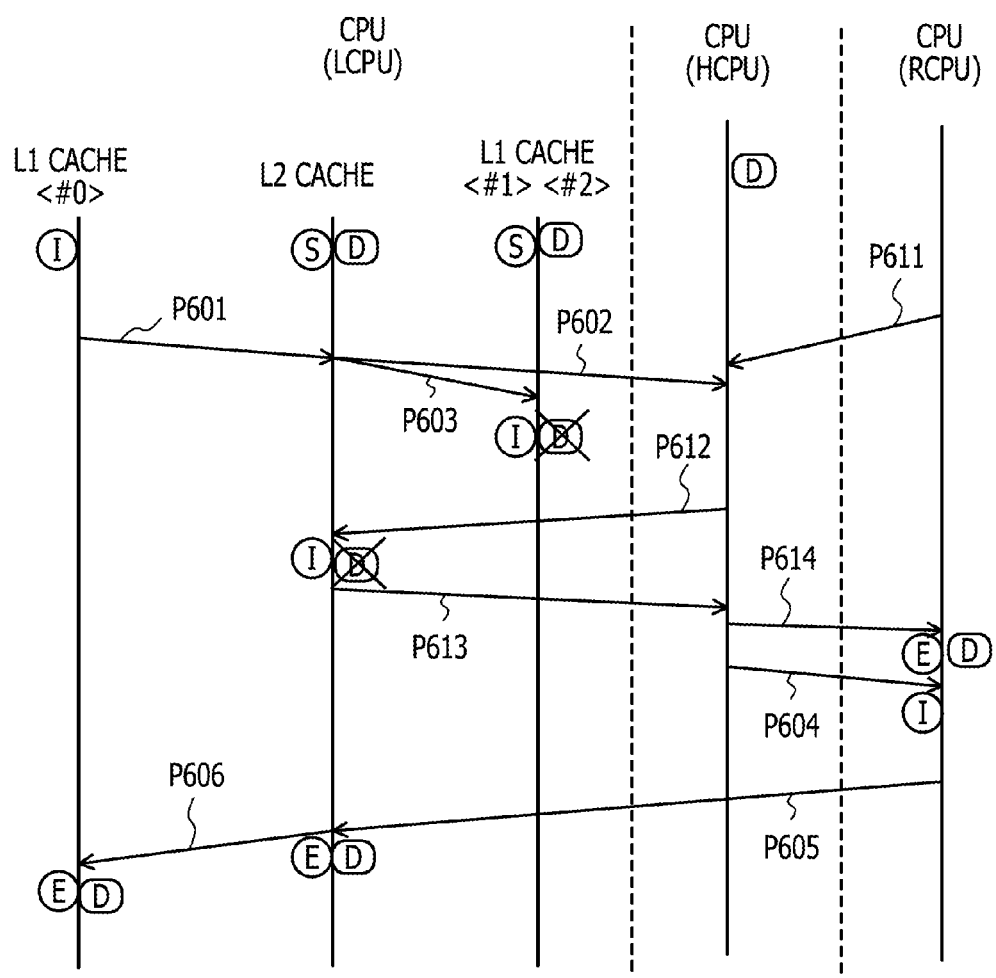
FIG. 12 is a sequence chart illustrating an example of the block type change processing in the multiprocessor system illustrated in FIG. 10.

In the multiprocessor system as illustrated in FIG. 10, there is a processing called a block type change in which when an LCPU issues a store request to a data block to which the LCPU has a right to share, the LCPU acquires an exclusive right from the HCPU which has a directory of the data block. FIG. 11 and FIG. 12 are sequential charts illustrating an example of the block type change processing in the multiprocessor system illustrated in FIG. 10. In FIG. 11 and FIG. 12, the reference numerals I, S, and E indicate an I (invalid) state, an S (Shared) state, and an E (Exclusive) state in the MESI protocol, respectively, and the reference numeral D indicates data.

In the example illustrated in FIG. 11, when the L1 cache memory <#0> of the LCPU issues a store request (P501), L2 cache memory of the LCPU issues an exclusive right acquisition request to the HCPU (P502). The L2 cache memory of the LCPU issues an invalidation request to L1 cache memories <#1> and <#2> which share a data block which becomes a target for the store request within the LCPU (P503 and P504), and the L1 cache memories <#1> and <#2> switch a state of the data block to the I state and invalidate the data block.

When an exclusive right acquisition response is returned from the HCPU (P505), the L2 cache memory of the LCPU switches a state of the data block to the E state and transfers data to the L1 cache memory <#0> which is an issuance source of the store request (P506). As such, since the LCPU has a right to share, the exclusive right acquisition response with no data is returned from the HCPU.

As illustrated in FIG. 12, there is a case where the exclusive right acquisition response added with data is returned. For example, when the L1 cache memory <#0> of the LCPU issues a store request (P601), the L2 cache memory of the LCPU issues an exclusive right acquisition request to the HCPU (P602). The L2 cache memory of the LCPU issues an invalidation request to the L1 cache memories <#1> and <#2> sharing a data block which becomes the target for the store request within the LCPU (P603), and the L1 cache memories <#1> and <#2> switch a state of the data block to the I state and invalidate the data block.

In a case where the RCPU has issued an exclusive right acquisition request to the HCPU earlier than the LCPU when the LCPU issues the exclusive right acquisition request to the HCPU, for example, in a case where the exclusive right acquisition request (P611) from the RCPU has arrived at the HCPU earlier than the exclusive right acquisition request (P602) from the LCPU, the exclusive right acquisition request issued by the LCPU is stopped without being accepted by the HCPU. The HCPU which has received the exclusive right acquisition request from the RCPU issues an invalidation request to the LCPU which shares a target data block (P612), and the L2 cache memory of the LCPU switches the state of the data block to the I state and invalidates the data block, and transmits a notification of the completion of invalidation to the HCPU (P613). The HCPU which has received the notification of completion of invalidation from the LCPU transmits the exclusive right acquisition response added with data to the RCPU and the RCPU switches the state of the data block to the E state (P614).

Thereafter, when the exclusive right acquisition request from the LCPU is accepted by the HCPU, the HCPU issues a data transfer request to the RCPU (P604), and the RCPU switches the state of the data block to the I state and transmits the exclusive right acquisition response added with data to the LCPU (P605). The L2 cache memory of the LCPU, which has received the exclusive right acquisition response added with data from the RCPU, switches the state of the data block to the E state and transfers the data added to the exclusive right acquisition response to the L1 cache memory <#0> which is the issuance source of the store request (P606)

In recent years, the number of cores included in a single CPU is increasing for an improvement of a processing speed or achievement of low power consumption. In a shared cache configuration illustrated in FIG. 10, when the number of cores increases, the capacity of a cache memory increases and thus, an amount of material to be processed becomes large and as a result, latency increases. In contrast, a divided cache configuration in which cache memories are divided between respective cores is adopted and thus, it is possible to reduce a latency degradation while increasing the capacity of the cache memory.

In the directory-based ccNUMA multiprocessor system which has adopted a CPU having a divided cache configuration in which L2 cache memories are divided between respective cores, when it is intended to implement the block type change processing similar to a shared cache configuration illustrated in FIG. 11, since a circuit unit to which the L2 cache memories are connected in common does not maintain data, data is not transferred to the L2 cache memory which is an issuance source of a store request and a state of a data block is not able to be switched to the E state. Therefore, it becomes a state where coherency is not maintained.

In regards to such a problem, although there is a way that solves the problem by changing the inter-CPU control in addition to the intra-CPU control, when the inter-CPU control is changed, an increase of the amount of material to be processed or a significant change in inter-CPU communication method may occur. Further, the exclusive right acquisition response added with data as illustrated in FIG. 12 may be applied to enable an implementation of the block type change processing only with a change of the intra-CPU control. However, a bus occupation ratio is increased due to latency degradation caused by invalidation processing of the cache memory or invalidation processing performed through the inter-CPU communication.

Figure 1:
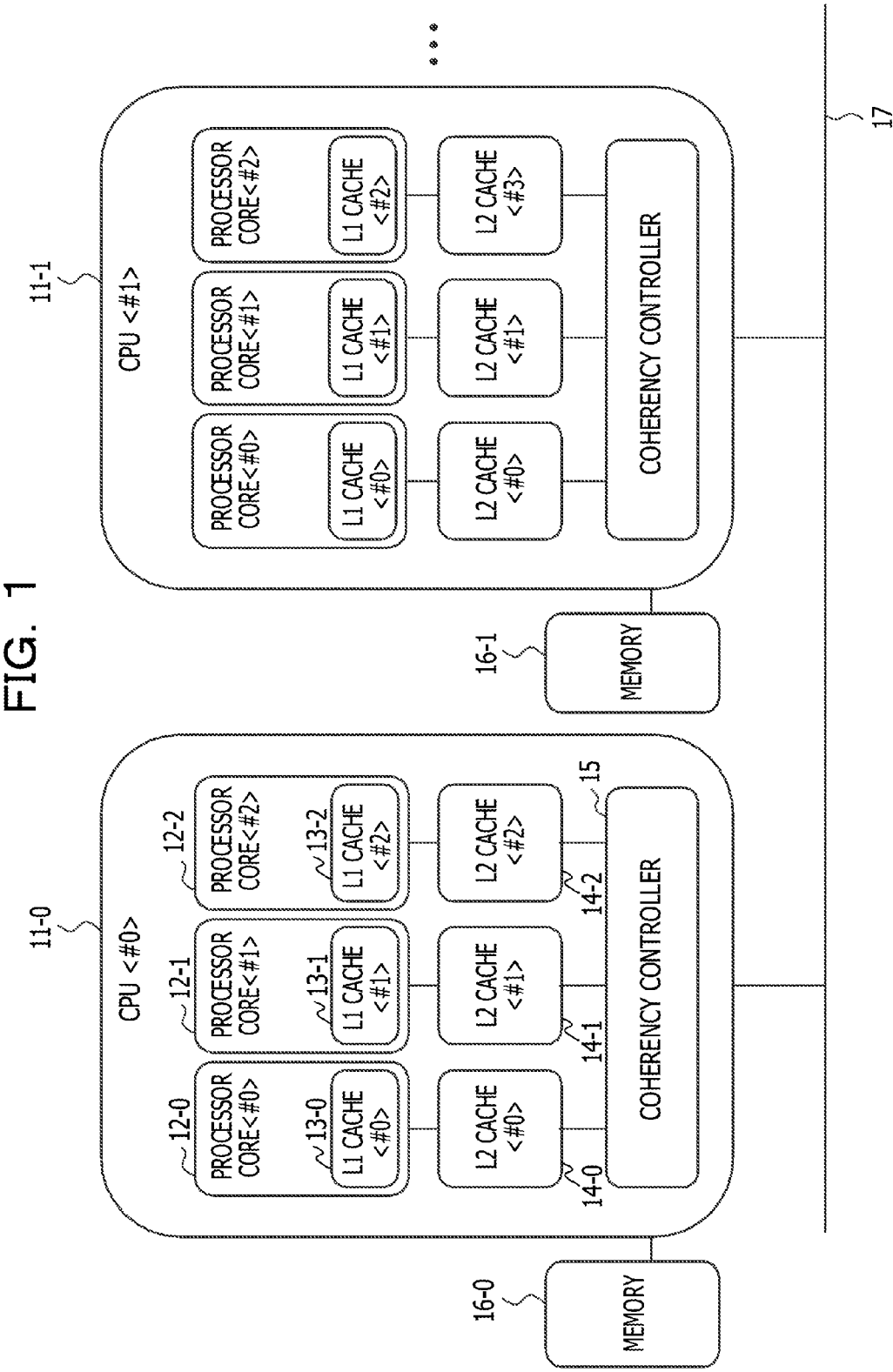
FIG. 1 is a block diagram illustrating an exemplary configuration of a multiprocessor system in an embodiment of the present disclosure.

Hereinafter, embodiments of the present disclosure will be described based on the accompanying drawings. FIG. 1 is a block diagram illustrating an exemplary configuration of a multiprocessor system including a Central Processing Unit (CPU) as an operation processing apparatus in an embodiment of the present disclosure. The multiprocessor system illustrated in FIG. 1 includes a plurality of pair sets of CPUs 11 (11-0, 11-1, . . . ) and memories 16 (16-0, 16-1, . . . ). A plurality of CPUs of CPU <#0> 11-0, CPU <#1> 11-1, . . . are connected with each other through a bus 17.

The multiprocessor system illustrated in FIG. 1 is, for example, a directory-based ccNUMA multiprocessor system in which each CPU 11 using a directory maintains a coherency between data stored in a memory 16 connected to the CPU 11 and data held in a cache memory by each CPU. The directory indicates the locations of data in the distributed memory, and is managed and controlled by each CPU. In the following descriptions, a CPU which has issued a certain request is called a Local CPU (LCPU), a CPU which has a directory of an address accessed by the request is called a Home CPU (HCPU), and other CPUs are called a Remote CPU (RCPU).

Each CPU 11 in the present embodiment is a CPU having a two-tier divided cache configuration in which secondary (L2: Level-2) cache memories 14 are divided between a plurality of processor cores 12 each of which includes a primary (L1: Level-1) cache memory 13. Each CPU 11 includes a plurality of processor cores 12, a plurality of L2 cache memories 14 and a coherency controller 15. In FIG. 1, an example is illustrated in which each CPU 11 includes three processor cores 12-0, 12-1, and 12-2 and three L2 cache memories 14-0, 14-1, and 14-2. In FIG. 1, an example is illustrated in which a hierarchy of the cache memory is a two-tier hierarchy, but a configuration having one-tier, three or more-tier hierarchy may be allowed.

Each processor core 12 includes a L1 cache memory 13 (13-0, 13-1, 13-2). The processor core 12 performs an operation processing using data held in the L1 cache memory 13 or issues a request such as a store request. Here, each processor core may correspond to an operation processing unit. The L2 cache memory 14 is installed in each processor core 12 and maintains a data block stored in the memory 16. The coherency controller 15 performs the intra-CPU arbitration on the L2 cache memory 14 and the inter-CPU arbitration on the L2 cache memories 14 to perform a coherency control between the L2 cache memories 14. In the present embodiment, an access to the memory 16 is performed through the coherency controller 15.

In the present embodiment, the state of a data block is controlled using, for example, the MESI protocol but, the type of protocol is not limited thereto. In the MESI protocol, the M (Modify) state indicates a state where a processor core maintains a data block and a data value is in a non-clean (i.e., dirty) state. The E (Exclusive) state indicates a state where a single processor core maintains a data block and a data value is in a clean state. The S (Multicore shared) state indicates that a plurality of processor cores shares a data block in a clean state. The I (Invalid) state indicates that a data block is an invalid state.

Figure 2:
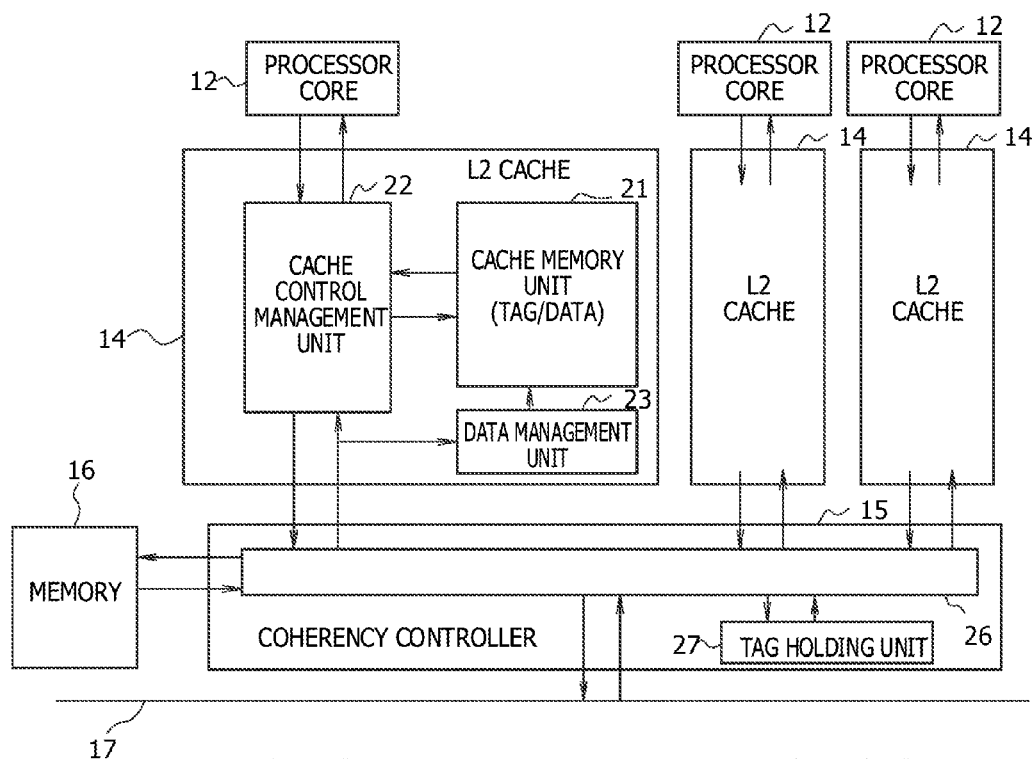
FIG. 2A is a block diagram illustrating an exemplary configuration of an operation processing apparatus in the present embodiment, and FIG. 2B and FIG. 2C diagrams illustrating examples of cache data and tag.

FIG. 2A is a block diagram illustrating an exemplary configuration of the CPU 11 as an operation processing apparatus in the present embodiment. In FIG. 2A, same reference numerals are given to constitutional elements having substantially the same function as those illustrated in FIG. 1, and the redundant descriptions thereof will not be repeated.

As illustrated in FIG. 2A, the L2 cache memory 14 includes a cache memory unit 21, a cache control management unit 22, and a data management unit 23. As illustrated in an example of a format of FIG. 2B, the cache memory unit 21 maintains data stored in the memory 16 as cache data and maintains a tag of the maintained data. The state of the data block maintained in the cache memory unit 21 and an address of the data block are contained in the tag. The cache control management unit 22 controls the cache memory unit 21 according to, for example, a request from the processor core 12 and the coherency controller 15, performs a data write or a data read for the cache memory unit 21, or switches a state of data block. The data management unit 23 manages, for example, an update of data in the cache memory unit 21.

The coherency controller 15 includes a coherency control unit 26 and a tag holding unit 27. The coherency control unit 26 performs a coherency control for the L2 cache memory 14. As illustrated in an example of a format of FIG. 2C, a copy of tags of all of the L2 cache memories 14 within the same CPU managed by the coherency controller 15 is held in the tag holding unit 27. The coherency control unit 26 refers to the copy of tags of the L2 cache memories 14 held in the tag holding unit 27 to perform the coherency control.

Next, descriptions will be made on an example of the block type change processing in the multiprocessor system according to the present embodiment. In the following, a case where L2 cache memories <#1> and <#2> of an LCPU have a right to share of a data block to which the HCPU has a directory and an L2 cache memory <#0> for the LCPU issues a store request will be described as an example.

Figure 3:
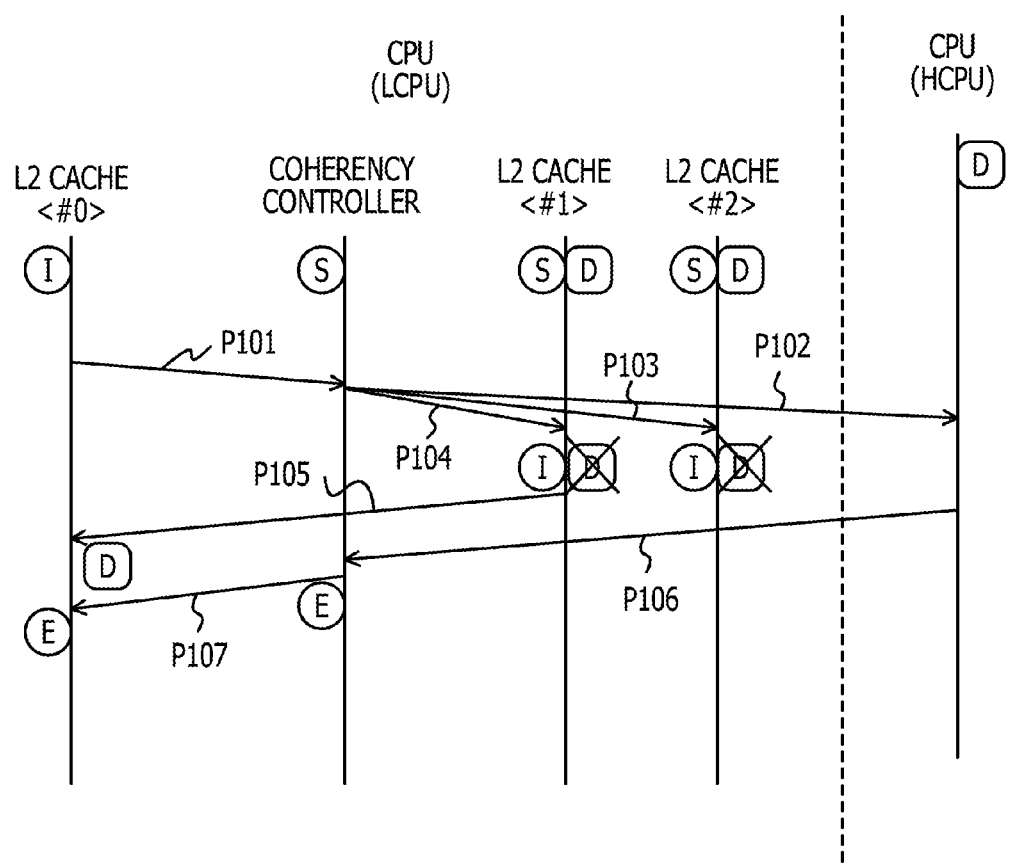
FIG. 3 is a sequence chart illustrating an example of block type change processing in the present embodiment.

As illustrated in FIG. 3, when the L2 cache memory <#0> of the LCPU issues a store request (P101), the coherency controller of the LCPU issues an exclusive right acquisition request to the HCPU (P102). The coherency controller of the LCPU issues a data transfer request to an L2 cache memory of the L2 cache memories that share a data block which becomes the target for the store request within the LCPU, and issues an invalidation request to the remaining L2 cache memories. In the meantime, the L2 cache memory which is a transmission destination for the data transfer request may be selected based on, for example, a Least Recently Used (LRU) caching scheme.

In an example illustrated in FIG. 3, the coherency controller of the LCPU issues the invalidation request to the L2 cache memory <#2> of the L2 cache memories <#1> and <#2> that share a data block which becomes the target for the store request within the LCPU (P103), and the L2 cache memory <#2> switches a state of the data block to the I state and invalidates the data block. The coherency controller of the LCPU issues a data transfer request to the L2 cache memory <#1> (P104), and the L2 cache memory <#1> switches a state of the data block to the I state and transmits data to the L2 cache memory <#0> (P105). Although the data transfer is performed between the L2 cache memories, data may be transferred from the coherency controller to the L2 cache memory <#0> after data is transferred to the coherency controller from the L2 cache memory <#1>.

When an exclusive right acquisition response is returned from the HCPU (P106), the coherency controller of the LCPU switches the state of the data block, which becomes a target for a store request, to the E state and transmits an exclusive right acquisition response to the L2 cache memory <#0>, and the L2 cache memory <#0> switches the state of the data block, which becomes a target for a store request, to the E state. The L2 cache memory <#0> of the LCPU which is an issuance source of the store request completes the block type change processing when two communications for data (P105) and the exclusive right acquisition response (P107) are completed. As described above, since data may be sent and received within the CPU, it is possible to suppress latency degradation and an increase of the bus occupation ratio between the CPUs and thus, a cache control may be implemented in a divided cache configuration.

Figure 4:
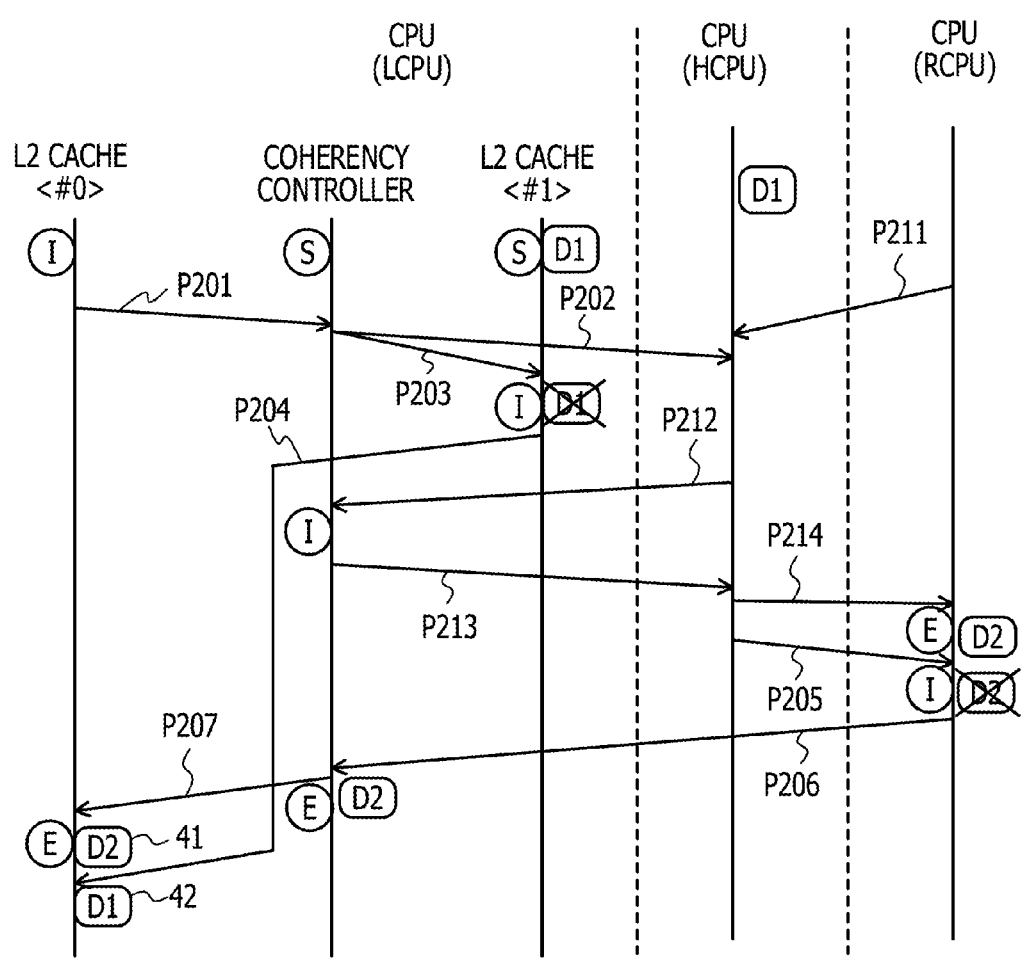
FIG. 4 is a sequence chart for explaining operations when an exclusive right acquisition response added with data is received.

Here, in a case where an exclusive right acquisition response added with data is returned, as illustrated in FIG. 4, data from the L2 cache memory <#1> of the LCPU may be arrived after data to be originally adopted have arrived in the L2 cache memory <#0> of the LCPU which is an issuance source of the store request.

For example, when the L2 cache memory <#0> of the LCPU issues a store request (P201), the coherency controller of the LCPU issues an exclusive right acquisition request to the HCPU (P202). Further, the coherency controller of the LCPU issues a data transfer request to the L2 cache memory <#1> that shares a data block which becomes the target for the store request within the LCPU, (P203), and the L2 cache memory <#1> switches a state of the data block to the I state and transmits data D1 to the L2 cache memory <#0> (P204).

In a case where the RCPU has issued an exclusive right acquisition request to the HCPU earlier than the LCPU (P211) when the LCPU issues the exclusive right acquisition request to the HCPU, the exclusive right acquisition request issued by the LCPU is stopped without being accepted by the HCPU. The HCPU which has received the exclusive right acquisition request from the RCPU issues an invalidation request to the LCPU which shares a target data block (P212), and the coherency controller of the LCPU switches the state of the data block to the I state to invalidate the data block and transmits the notification of the completion of invalidation to the HCPU (P213). The HCPU which has received the notification of the completion of invalidation from the LCPU transmits the exclusive right acquisition response added with data to the RCPU and the RCPU switches a state of the data block to the E state (P214).

Thereafter, when the exclusive right acquisition request from the LCPU is accepted by the HCPU, the HCPU issues a data transfer request to the RCPU (P205), and the RCPU switches the state of the data block to the I state and transmits an exclusive right acquisition response added with data D2 to the LCPU (P206). The coherency controller of the LCPU, which has received the exclusive right acquisition response added with data from the RCPU, switches the state of the data block to the E state and transfers data D2 added to the exclusive right acquisition response to the L2 cache memory <#0> which is an issuance source of the store request (P207).

As illustrated in FIG. 4, when there is a case where the data D1 transmitted from the L2 cache memory <#1> of the LCPU arrives after the newest data D2 transmitted from the RCPU has arrived, it may be required to perform a control such that the newest data D2 transmitted from the RCPU is adopted. Thus, in the present embodiment, a flag for the exclusive right acquisition response, which is set to "1" when the exclusive right acquisition response from the RCPU is received and set to "0" when data update of the L2 cache memory which is an issuance source of a store request is ended, is provided in the L2 cache memory. The L2 cache memory refers to the flag at the time of storing data to be written in an internal buffer, and controls in such a way when the value of the flag is "0," data written in the buffer is updated and otherwise, when a value of the flag is "1," data written in the buffer is not updated.

Figures 5A, 5B, 5C:
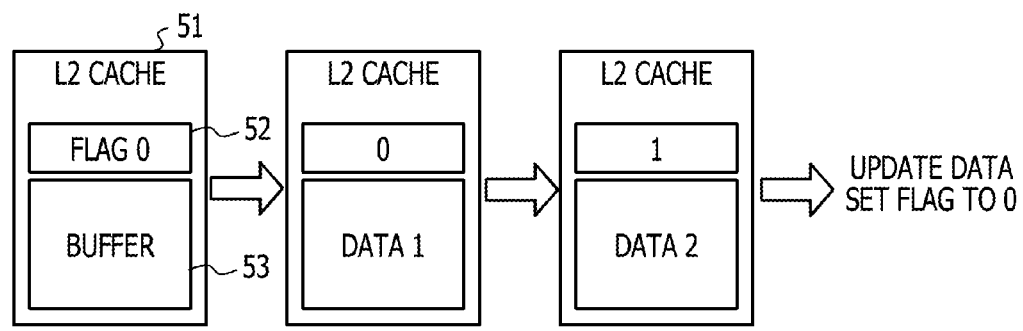
FIG. 5A, FIG. 5B, and FIG. 5C are diagrams for explaining data update in an L2 cache memory of the operation processing apparatus in the present embodiment.

For example, as illustrated in FIG. 5A, it is assumed that data Data1 is transferred from the L2 cache memory of the LCPU in a state where a value of a flag 52 is "0" and data is not written in a buffer 53 in the L2 cache memory <#0> 51 of the LCPU which is an issuance source of a store request. In this case, since the value of the flag 52 is "0," as illustrated in FIG. 5B, the buffer 53 is updated with the data Data1. However, since it is a data transfer from the L2 cache memory, the value of the flag 52 remains "0" as it is and is not updated.

Thereafter, when data Data2 and the exclusive right acquisition response are transferred from the RCPU, since the value of the flag 52 is"0," as illustrated in FIG. 5C, the buffer 53 is updated with the data Data2. Since it is an exclusive right acquisition response transferred from the RCPU, the value of the flag 52 is updated with "1." Also, the cache data of the L2 cache memory is updated with the data Data2 present in the buffer 53 and the value of the flag 52 is reset to "0."

Figures 6A, 6B, 6C:
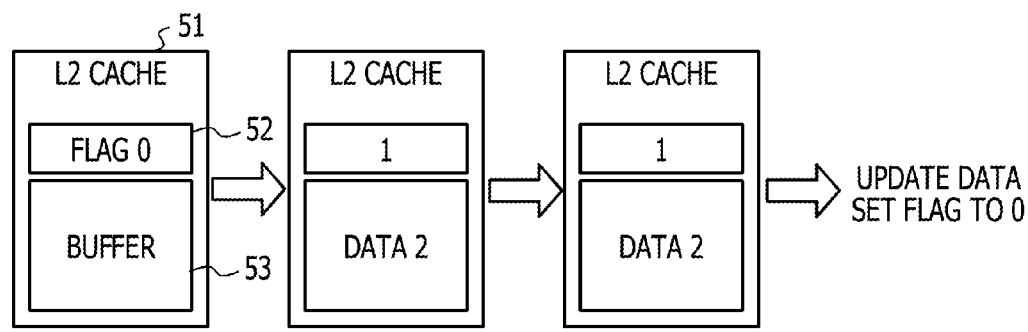
FIG. 6A, FIG. 6B, and FIG. 6C are diagrams for explaining the data update in the L2 cache memory of the operation processing apparatus in the present embodiment.

For example, as illustrated in FIG. 6A, it is assumed that the data Data2 and the exclusive right acquisition response are transferred from the RCPU in a state where a value of the flag 52 is "0" and data is not written in a buffer 53 in the L2 cache memory <#0> 51 of the LCPU which is an issuance source of a store request. In this case, since the value of the flag 52 is "0," as illustrated in FIG. 6B, the buffer 53 is updated with the data Data2, and since it is an exclusive right acquisition response transferred from the RCPU, the value of the flag 52 is updated with "1."

Thereafter, when the data Data1 is transferred from the L2 cache memory of the LCPU, since the value of the flag 52 is "1," as illustrated in FIG. 6C, the data Data2 is maintained in the buffer 53 without being updated. Also, the cache data of the L2 cache memory is updated with the data Data2 present in the buffer 53 and the value of the flag 52 is reset to "0."

FIG. 7 is a flowchart illustrating an example of a process for the data update of the L2 cache memory described above. In FIG. 7, a process for the data update in a case where two data transfers of a data transfer from the L2 cache memory of the LCPU and a data transfer from the RCPU are present is illustrated. The presence of the two data transfers may be recognized by a flag indicating that two data transfers are present.

The L2 cache memory which is an issuance source of a store request confirms whether a data transfer from the L2 cache memory of the LCPU or the RCPU has arrived at step S101. When it is determined that the data transfer from any of the L2 cache memory of the LCPU and the RCPU has arrived, the L2 cache memory determines whether a value of the flag of the exclusive right acquisition response is "0" at step S102.

When it is determined that the value of the flag of the exclusive right acquisition response is "0," the L2 cache memory updates the buffer with data transferred at step 103. Further, the L2 cache memory determines whether it is a data transfer from the RCPU at step 104. When it is determined that it is the data transfer from the RCPU, the L2 cache memory updates the value of the flag of the exclusive right acquisition response with "1" at step 105. Otherwise, when it is determined that it is not the data transfer from the RCPU, the L2 cache memory skips the step 105. In the meantime, when it is determined that the value of the flag of the exclusive right acquisition response is not "0" at step 102, the data update process proceeds to step 106.

Subsequently, the L2 cache memory determines whether two types of data transfers, that is, the data transfer from the L2 cache memory of the LCPU and the data transfer the RCPU have arrived at step 106. When it is determined that the two types of data transfers have arrived, the data update process proceeds to step 107 and otherwise, the process goes back to step 101. The L2 cache memory updates the data of the cache memory unit with the data of the buffer and resets the value of the flag of the exclusive right acquisition response to "0" at step 107, and the data update process is ended.

As described above, a data write into the L2 cache memory is controlled such that it becomes possible to write the data, which is received by being added with the exclusive right acquisition response, into the L2 cache memory. Therefore, it is possible to implement an appropriate cache control even when an order of the data transfer from the L2 cache memory of the LCPU and the data transfer from the RCPU is not guaranteed.

Figure 8:
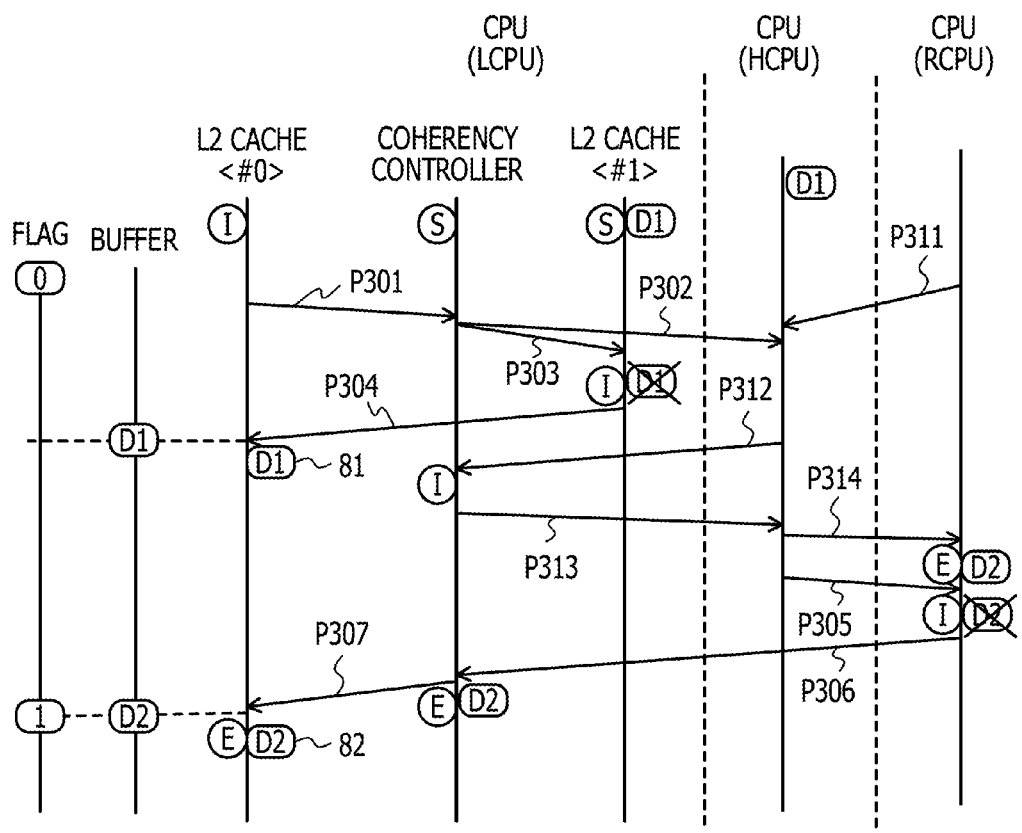
FIG. 8 is a sequence chart illustrating an example of the block type change processing in the present embodiment.

FIG. 8 is a sequence chart illustrating an example of the block type change processing including the control of data update as described above. As illustrated in FIG. 8, when the L2 cache memory <#0> of the LCPU issues a store request (P301), the coherency controller of the LCPU issues an exclusive right acquisition request to the HCPU (P302). The coherency controller of the LCPU issues a data transfer request to the L2 cache memory <#1> which shares a data block which becomes the target for the store request within the LCPU (P303), and the L2 cache memory <#1> switches the state of the data block to the I state and transmits the data D1 to the L2 cache memory <#0> (P304).

Since the value of the flag of the exclusive right acquisition response is "0," the L2 cache memory <#0> which has received the data D1 transferred from the L2 cache memory <#1> updates the buffer with the received data D1 (81). In this case, since it is the data transfer from the L2 cache memory of the LCPU, the value of the flag of the exclusive right acquisition response remains "0" as it is.

In a case where the RCPU has issued an exclusive right acquisition request to the HCPU earlier than the LCPU (P311) when the LCPU issues the exclusive right acquisition request to the HCPU, the exclusive right acquisition request issued by the LCPU is stopped without being accepted by the HCPU. The HCPU, which has received the exclusive right acquisition request from the RCPU, issues an invalidation request to the LCPU which shares a target data block (P312). The coherency controller of the LCPU switches the state of the data block to the I state to invalidate the data block and transmits a notification of the completion of invalidation to the HCPU (P313). The HCPU which has received the notification of the completion of invalidation from the LCPU transmits the exclusive right acquisition response added with data to the RCPU and the RCPU switches the state of the data block to the E state (P314).

Thereafter, when the exclusive right acquisition request from the LCPU is accepted by the HCPU, the HCPU issues a data transfer request to the RCPU (P305). The RCPU switches the state of the data block to the I state and transmits the exclusive right acquisition response added with data D2 to the LCPU (P306). The coherency controller of the LCPU, which has received the exclusive right acquisition response added with data from the RCPU, switches the state of the data block to the E state and transfers the data D2 added to the exclusive right acquisition response to the L2 cache memory <#0> which is an issuance source of the store request (P307).

Since the value of the flag of the exclusive right acquisition response is "0," the L2 cache memory <#0> which has received the data D2 and the exclusive right acquisition response transferred from the RCPU, updates the buffer with the received data D2 (82). Since it is the data transfer by the exclusive right acquisition response from the RCPU, the L2 cache memory <#0> updates the value of the flag of the exclusive right acquisition response with "1."

Figure 9:
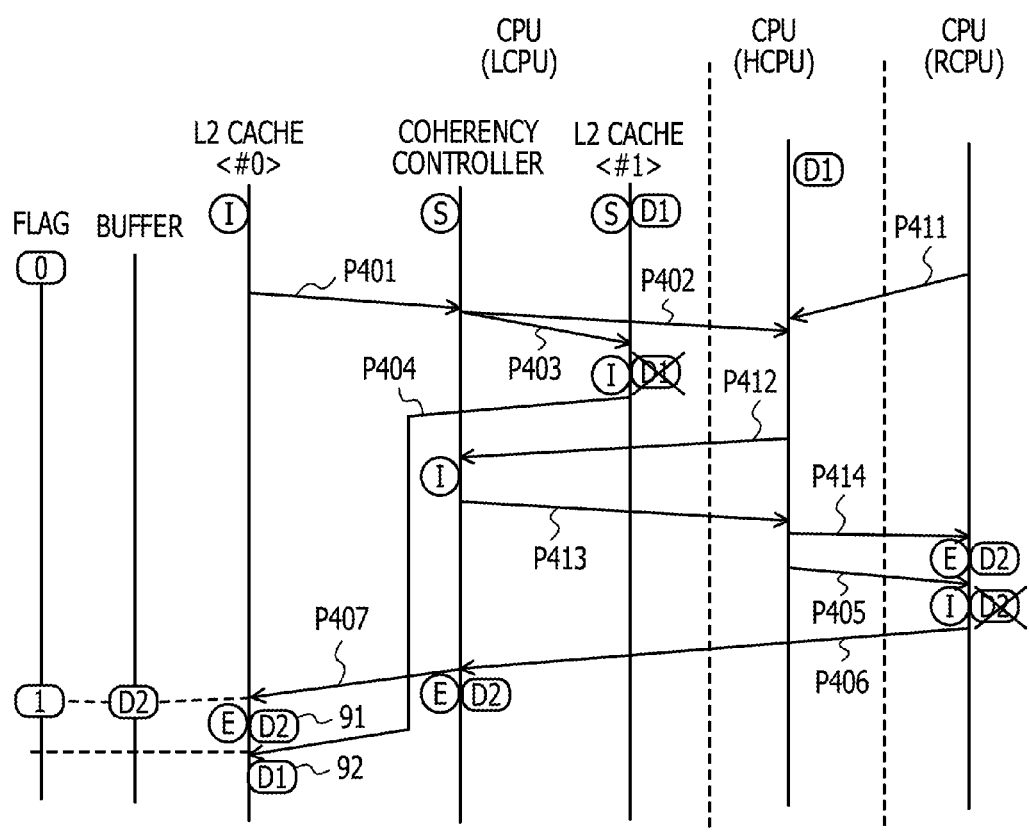
FIG. 9 is a sequence chart illustrating another example of the block type change processing in the present embodiment.

FIG. 9 is a sequence chart illustrating another example of the block type change processing including the control of data update described above. As illustrated in FIG. 9, when the L2 cache memory <#0> of the LCPU issues a store request (P401), the coherency controller of the LCPU issues an exclusive right acquisition request to the HCPU (P402). The coherency controller of the LCPU issues a data transfer request to the L2 cache memory <#1> which shares a data block which becomes the target for the store request within the LCPU (P403), and the L2 cache memory <#1> switches the state of the data block to the I state and transmits the data D1 to the L2 cache memory <#0> (P404).

In a case where the RCPU has issued an exclusive right acquisition request to the HCPU earlier than the LCPU (P411) when the LCPU issues the exclusive right acquisition request to the HCPU, the exclusive right acquisition request issued by the LCPU is stopped without being accepted by the HCPU. The HCPU which has received the exclusive right acquisition request from the RCPU issues an invalidation request to the LCPU which shares a target data block (P412). The coherency controller of the LCPU switches a state of the data block to the I state to invalidate the data block, and transmits a notification of the completion of invalidation to the HCPU (P413). The HCPU which has received the notification of the completion of invalidation from the LCPU transmits the exclusive right acquisition response added with data to the RCPU, and the RCPU switches the state of the data block to the E state (P414).

Thereafter, when the exclusive right acquisition request from the LCPU is accepted by the HCPU, the HCPU issues a data transfer request to the RCPU (P405), and the RCPU switches the state of the data block to the I state and transmits the exclusive right acquisition response added with data D2 to the LCPU (P406). The coherency controller of the LCPU which has received the exclusive right acquisition response added with data from the RCPU switches the state of the data block to the E state and transfers the data D2 added to the exclusive right acquisition response to the L2 cache memory <#0> which is an issuance source of the store request (P407).

Since the value of the flag of the exclusive right acquisition response is "0," the L2 cache memory <#0>, which has received the data D2 and the exclusive right acquisition response transferred from the RCPU, updates the buffer with the received data D2 (91). Since it is the data transfer by the exclusive right acquisition response from the RCPU, the L2 cache memory <#0> updates the value of the flag of the exclusive right acquisition response with "1." Thereafter, when the L2 cache memory <#0> receives the data D1 transferred from the L2 cache memory <#1>, since the value of the flag of the exclusive right acquisition response is "1," the buffer update with the received data D1(92) is not performed.

According to the present embodiment, a mechanism for performing a data transfer between the L2 cache memories 14 is provided in the coherency controller 15 and also the flag of the exclusive right acquisition response is provided in the L2 cache memory. With this feature, it is possible to perform a coherency control of the cache memory without significantly changing the inter-CPU control and increasing the bus occupation ratio between the CPUs in the multiprocessor system which adopts the CPU having a divided cache configuration. Accordingly, it is possible to implement the cache control in the divided cache configuration without causing a latency degradation or changing an inter-CPU protocol scheme.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An operation processing apparatus comprising:
   a plurality of processor cores each configured to perform an operation processing;
   a plurality of cache memories each provided for the respective processor cores; and
   a controller configured to perform a coherency control between the plurality of cache memories, the controller, in the coherency control, in a case where one or more shared cache memories which share a target data block for a store request are present in the plurality of cache memories when the store request is received from a request cache memory included in the plurality of cache memories:
  requests one cache memory of the one or more shared cache memories to transfer the target data block to the request cache memory while issuing an invalidation request to remaining of the one or more shared cache memories excluding the one cache memory;
  issues a request for an exclusive right acquisition response to another operation processing apparatus which does not include the request cache memory and has a directory of the target data block to manage a state of the target data block; and
  upon receiving the exclusive right acquisition response from the another operation processing apparatus, transmits the exclusive right acquisition response to the request cache memory.

2. The operation processing apparatus according to claim 1, wherein each of plurality of cache memories is configured to include a flag which is set when the exclusive right acquisition response added with data is received and is reset when the cache memory is updated with the data added to the exclusive right acquisition response.

3. The operation processing apparatus according to claim 2, wherein each of plurality of cache memories is configured to include a buffer in which a write of received data is performed when the flag is in a reset state and the write of received data is not performed when the flag is in a set state.

4. The operation processing apparatus according to claim 1, wherein the controller is configured to maintain tag information that contains a state of a data block in each of the cache memories for all of the cache memories and to perform the coherency control between the plurality of cache memories by referring to the maintained tag information.

5. The operation processing apparatus according to claim 1, wherein the controller is configured to select the one cache memory of the one or more shared cache memories based on a Least Recently Used (LRU) caching scheme.

6. A control method of an operation processing apparatus, the control method comprising:
  controlling, by a controller of the operation processing apparatus that performs a coherency control between a plurality of cache memories each provided for respective processors configured to perform an operation processing, in a coherency control, in a case where one or more shared cache memories which share a target data block for a store request are present in the plurality of cache memories when the store request is received from a request cache memory included in the plurality of cache memories, one cache memory of the one or more shared cache memories such that the target data block is transferred from the one cache memory to the request cache memory;
  issuing, by the controller, an invalidation request to remaining of the one or more shared cache memories excluding the one cache memory;
  issuing, by the controller, a request for an exclusive right acquisition response to another operation processing apparatus which does not include the request cache memory and has a directory of the target data block to manage a state of the target data block; and
  upon receiving the exclusive right acquisition response from the another operation processing apparatus, transmitting the exclusive right acquisition response to the request cache memory.

7. The control method according to claim 6, wherein each of plurality of cache memories is configured to include a flag which is set when the exclusive right acquisition response added with data is received and is reset when the cache memory is updated with the data added to the exclusive right acquisition response.

8. The control method according to claim 7, wherein each of plurality of cache memories is configured to include a buffer in which a write of received data is performed when the flag is in a reset state and the write of received data is not performed when the flag is in a set state.

9. The control method according to claim 6, wherein tag information that contains a state of a data block in each of the cache memories is maintained for all of the cache memories and the coherency control between the plurality of cache memories is performed by referring to the maintained tag information.

10. The control method according to claim 6, wherein the one cache memory of the one or more shared cache memories is selected based on a Least Recently Used (LRU) caching scheme.

* * * * *